United States Patent [19]

Winter et al.

[11] Patent Number: 4,585,304
[45] Date of Patent: Apr. 29, 1986

[54] TECHNIQUE FOR REPAIRING AND JOINING SMALL DIAMETER OPTICAL FIBER CABLES

[75] Inventors: Joseph Winter, New Haven; Michael J. Pryor, Woodbridge, both of Conn.

[73] Assignee: Virginia, New Haven, Conn.

[21] Appl. No.: 529,297

[22] Filed: Sep. 6, 1983

[51] Int. Cl.$^4$ ............................................. G02B 6/38
[52] U.S. Cl. .............................. 350/96.21; 350/96.23
[58] Field of Search ............... 350/96.20, 96.21, 96.22, 350/96.23

[56] References Cited

U.S. PATENT DOCUMENTS

| | | | |
|---|---|---|---|
| 4,196,965 | 4/1980 | Matsuno | 350/96.21 |
| 4,367,917 | 1/1983 | Gray | 350/96.23 |
| 4,375,720 | 3/1983 | Bourget | 29/869 |
| 4,379,614 | 4/1983 | Liertz | 350/96.21 |
| 4,404,010 | 9/1983 | Bricheno et al. | 350/96.21 X |

FOREIGN PATENT DOCUMENTS

| | | | |
|---|---|---|---|
| 0078049 | 5/1983 | European Pat. Off. | 350/96.20 |
| 54-11753 | 1/1979 | Japan | 350/96.21 |
| 56-133707 | 10/1981 | Japan | 350/96.21 |
| 58-25612 | 2/1983 | Japan | 350/96.20 |

*Primary Examiner*—John Lee
*Attorney, Agent, or Firm*—Barry L. Kelmachter; Howard M. Cohn; Paul Weinstein

[57] ABSTRACT

A technique for repairing or joining lengths of ultrafine, small diameter optical fiber cables is described. The technique comprises: positioning a hollow cylindrical ferrule over one of two cable portions; forming a splice joint between the optical fibers to be joined together; forming a protective buffer layer about the splice joint; sliding the ferrule over the protective buffer layer and into overlapping relationship with each cable portion; and bonding the ferrule to each cable portion. An apparatus for performing the repair or joining technique is also described.

20 Claims, 6 Drawing Figures

TECHNIQUE FOR REPAIRING AND JOINING SMALL DIAMETER OPTICAL FIBER CABLES

The present invention relates to a technique for repairing or joining together small diameter optical fiber cables.

Optical fiber cables have become widely used in communication applications because of such advantages as low loss, light weight and relatively wide transmission bands. Lately, there has been a growing interest in cable constructions incorporating ultra-fine, individually metal armored optical fibers. The provision of individually metal armored optical fibers allows the construction of unique small diameter multi-fiber cable arrangements. The metal armor surrounding each fiber serves to protect the optical fiber from damage during fabrication into the desired end use cable. It also can be used as an electrical conductor and/or a strengthening member. By grouping a plurality of individually metal armored optical fibers together, the armoring can act as a plurality of electrical conductors for providing redundancy if needed or the opportunity for differing circuit arrangements for repeaters.

The main deficiency of optical fiber cables has been their fragility. It is not uncommon for an optical fiber to break during use. Similarly, it is not unusual for an optical fiber and/or the metal armor to break or otherwise become damaged during cable construction. Therefore, it becomes desirable to have a readily available and relatively simple technique for repairing damaged or broken cables.

Another deficiency of many optical fiber cables is that they can only be manufactured in limited lengths. Where extremely long lengths of cable are needed, this means that several lengths of cable have to be joined together. Therefore, it also becomes desirable to have a readily available and relatively simple technique for joining together lengths of cable.

Techniques for repairing and/or joining cable constructions having a metal tube containing one or more optical fibers and a gel-type filler material or an equivalent insulating material are known in the art. However, these techniques do not work for ultra-fine metal armored optical fibers where the optical fiber and any surrounding buffer material are encapsulated in a metal tube whose inner diameter is substantially equal to or just slightly larger than the fiber/buffer material outer diameter. The known repair techniques often include a swaging or draw down step to reduce the outer diameter of a portion of the cable. Performing a swaging or draw down step on an ultra-fine armored optical fiber could severely damage the optical fiber. Another deficiency of these techniques is their reliance upon a butt welding technique to join one metal component to another. Butt welds generally have a tensile strength lower than the tensile strength of the metal forming the cable tube or armor. As a result, where the metal tube is required to function as a strength member, these welds could be a weak link that ultimately leads to tube and/or cable failure. U.S. Pat. Nos. 4,367,917 to Gray, 4,375,720 to Bourget and 4,379,614 to Liertz illustrate some of the prior art repair and/or joining techniques.

In yet another approach for repairing and/or joining together cable constructions having a metal tube containing one or more optical fibers and a gel-type filler material, a metal ferrule is inserted into a first metal tube section to be joined to a second metal tube section. After the optical fiber or fibers within the tube sections have been spliced together, the ferrule is slid into a position bridging the gap between the tube sections. The ferrule is then soldered into place, a replacement filler material is injected inside the ferrule and an outer covering is fabricated about the ferrule. This approach is illustrated in co-pending U.S. patent application Ser. No. 508,174, filed June 27, 1983 to Winter et al. Obviously, this approach could not be readily used to repair or join together ultra-fine, small diameter armored optical fibers where the metal armor tube has an inner diameter substantially equal to or only slightly larger than the outer diameter of the optical fiber buffer material.

In accordance with the present invention, a method and apparatus for repairing or joining together ultra-fine, small diameter optical fiber cables is provided that is relatively simple to perform and use. Using the method described herein, a repair patch or joint connection may be made that does not significantly derate the mechanical properties of the cable and does not significantly increase optical fiber attenuation. In some instances, the repair patch or joint connection may be as strong as or stronger than the original cable construction. The repair and joining method of the present invention is particularly applicable to ultra-fine optical fiber cables having individually armored optical fibers.

The repair patch or joint connection in accordance with this invention is preferably accomplished by: positioning a hollow cylindrical ferrule over one or two cable portions to be joined together; forming a splice joint between the optical fibers to be joined together; forming a protective buffer layer around the splice joint; sliding the ferrule into a position about the protective buffer layer and into abutting relationship with both cable portions; and bonding the ferrule to each cable portion. The protective buffer layer about the fiber splice joint preferably has an outer diameter substantially equal to the outer diameter of the metal armor tube surrounding each optical fiber.

In a preferred manner of performing the present invention, the protective buffer layer is formed by placing the two cable portions with the spliced fibers in a clamping device. The clamping device comprises a pair of platens each having a groove adapted to fit in close relationship about the metal armor tubes. When placed in abutting relationship, the platens and the grooves define a cylindrical area about the fiber splice having a diameter substantially equal to the outer diameter of the tubes. One of the platens is provided with an aperture for injecting an appropriate buffer material into the cylindrical area and at least one other aperture for exhausting air and gases from the cylindrical area. To accelerate curing of the buffer material, the other of the platens may contain small heating elements. In a preferred embodiment, the clamping device comprises a hand tool to which the platens are attached.

Since the ferrule forms the major structural component of the patch or joint connection, it is important that the material forming the ferrule meet certain requirements. For example, the metal or metal alloy forming the ferrule should have strength characteristics substantially equal to the strength characteristics of the metal armoring. If the metal armoring also functions as an electrical conductor, the metal or metal alloy forming the ferrule should have electrical conductivity characteristics similar to the electrical conductivity characteristics of the metal armoring. In order to decrease the possibililty of electronic noise and mechanical interference during subsequent fabrication operations, the ends of the ferrule are preferably smooth and blended or tapered to an appropriate angle.

In a preferred embodiment, a mechanical bond is formed between the ferrule and each armor tube by brazing or soldering. To form a more effective bond, the inner surface of the ferrule is preferably coated with an appropriate solder or brazing material.

The method of the present invention may be used to repair an individually armored optical fiber which has been broken or damaged. The method may also be used to join together several lengths of individually armored optical fiber. After the repair patch or joint connection has been made, one or more additional layers may be fabricated about the repaired or joined optical fiber cable. For example, where the fiber and the metal armor are to be utilized as conductors, they may be provided with a suitable insulative coating about the metal armoring.

Accordingly, it is an object of the present invention to provide a method and apparatus for repairing or joining together ultra-fine, small diameter, individually armored optical fiber cables.

It is a further object of the present invention to provide a method and apparatus as above that is relatively simple to perform and use.

It is a further object of the present invention to provide a method and apparatus as above that does not significantly derate the mechanical and/or electrical conductivity properties of the metal armoring housing the optical fiber and does not significantly increase fiber attenuation.

These and other objects will become more apparent from the following description and drawings in which like elements have been given like reference numbers.

Figure 1:
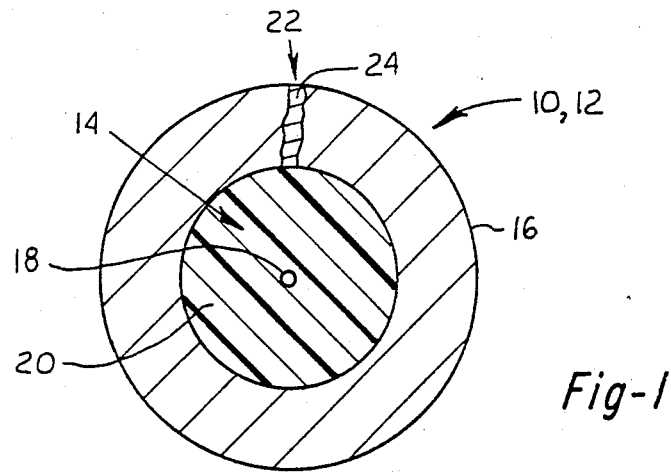
FIG. 1 is a cross-sectional view of an ultra-fine, small diameter, individually armored optical fiber cable.
Figure 2:
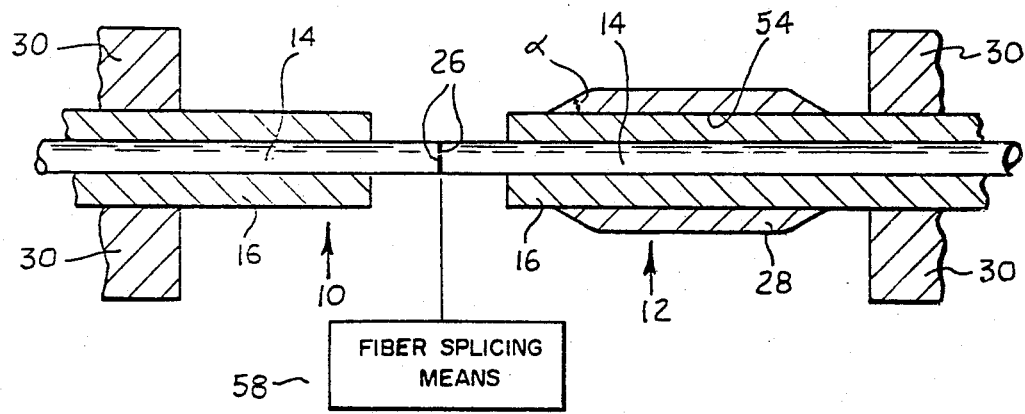
FIG. 2 is a side view in partial cross section of two cable portions to be joined together.
Figure 3:
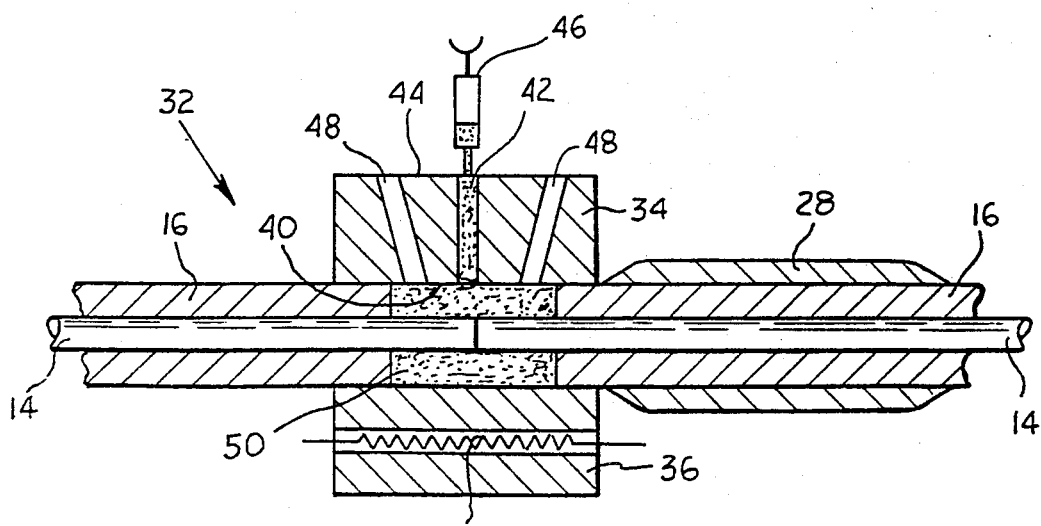
FIG. 3 is a side view in partial cross section of an intermediate stage of forming the joint or patch between the two cable portions.
Figure 4:
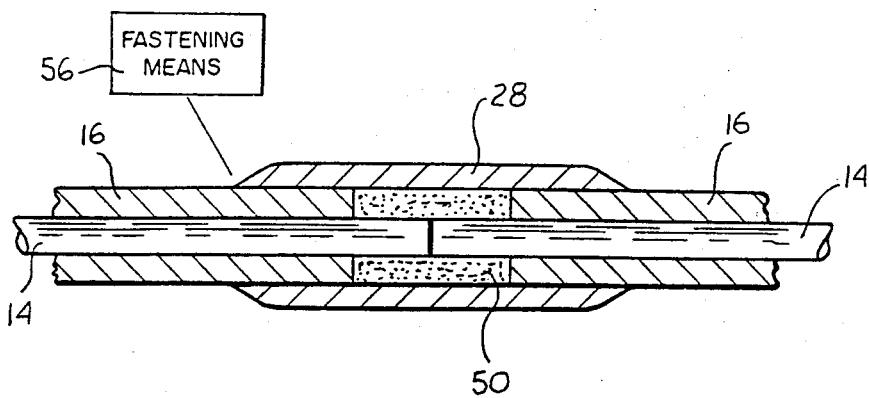
FIG. 4 is a side view in partial cross section of a repair patch or joint formed by the method of the present invention.
Figure 5:
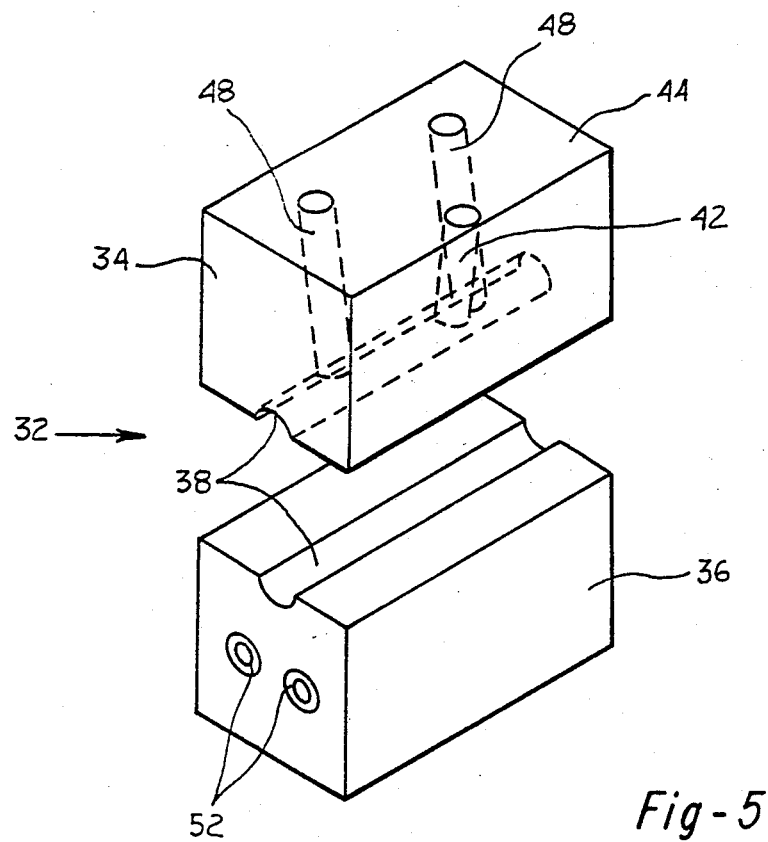
FIG. 5 is a schematic representation of the platens used to form a clamping device for performing the method of the present invention.

In accordance with the present invention, it is proposed to provide a method for repairing or joining together ultra-fine, small diameter, individually armored optical fibers without significantly derating the mechanical and/or electrical conductivity properties of the metal armor about each optical fiber and without significantly increasing fiber attenuation. This is accomplished by forming a protective buffer layer around a fiber splice joint and bonding a metal or metal alloy ferrule surrounding the protective buffer layer to each metal armor tube. The metal or metal alloy forming the ferrule preferably has physical properties similar to those of the metal or metal alloy forming the armoring.

Referring now to the drawings, two optical fiber cable portions 10 and 12 to be joined together are illustrated. The cable portions 10 and 12 may be two lengths of virgin cable to be joined together or they may come from a single cable construction in which an optical fiber 14 has become damaged or broken. Each cable portion generally comprises a metal or metal alloy armoring tube 16 and an optical fiber 14. The optical fiber 14 is typically composed of a fiber optic element 18 surrounded by a plastic protective or buffer layer 20. The armoring tube 16 generally comprises a metal sheath including a longitudinally extending seam 22. Often, the seam 22 is sealed by some suitable means such as solder 24 or a coating not shown for purposes of hermeticity. In a typical construction, the optical fiber 14 occupies substantially all of the internal area of the tube 16.

If the cable portions 10 and 12 come from a single cable construction having a damaged or broken optical fiber, they may be formed by first removing in the area in which the repair patch is to be made any external layers not shown surrounding the tube 16. After the tube 16 has been laid bare, a section of the tube 16 is removed to expose the damaged fiber area or the broken fiber ends. Any suitable means (not shown) known in the art, such as a razor blade and/or a pipe cutting tool, may be used to remove any external layers and the tube section. In a preferred manner of performing the method of the present invention, enough of the tube 16 is removed that at least about 1", preferably from about 1" to about 2", of undamaged fiber 14 extends from each of the cable portions 10 and 12.

If the cable portions 10 and 12 are virgin cables, the joining method of the present invention is preferably performed prior to the fabrication of any external layers. Each virgin length of cable should have at least about 1" and preferably from about 1" to about 2" of fiber 14 extending from the end or ends to be joined together. If necessary, the armor tube 16 in one or more of the portions 10 and 12 may be trimmed back using a suitable tube cutting device not shown to expose the desired length of optical fiber 14.

If necessary, the exposed ends 26 of the fibers 14 may be trimmed so that clean ends suitable for splicing are provided. In some splicing techniques, it is desirable to provide each end 26 with a true normal face. Depending upon the fiber splicing technique utilized, it may also be desirable to remove a portion of the buffer material 20 surrounding the end of the fiber optic element 18. The buffer material may be removed using any conventional means (not shown) known in the art such as a knife or a razor blade.

Prior to splicing together the fiber ends 26, a hollow cylindrical tubular member or ferrule 28 is positioned about the armor tube 16 of one of the cable portions 10 or 12. The ferrule should be positioned on the tube 16 so that it does not interfere with the fiber splicing procedure.

The ferrule 28 possesses an inner diameter that enables it to be placed over the tubes 16. The inner diameter of the ferrule should be only slightly larger than the outer diameter of each tube 16. Preferably, the ferrule's inner diameter is from about 0.002" to about 0.010" greater than the outer diameter of each tube 16.

In performing the method of the instant invention, it is quite important that the ferrule 28 be fabricated from a material possessing certain strength and electrical conductivity properties. For example, since the ferrule 28 is intended to provide strength, the ferrule material preferably possesses a tensile strength substantially equal to or greater than the tensile strength of the material forming the tubes 16. By forming the ferrule 28 from such a material, it is possible for the repair patch or connection joint formed by the method of the instant invention to be as strong as or stronger than the original cable construction. Where the tubes 16 act as an electrical conductor, it is desirable that the ferrule material possess an electrical conductivity substantially equal to that of the material forming tubes 16. The ferrule material should also be bondable to the tubes 16. Preferably, the ferrule 28 is formed from a relatively high strength material such as steel, stainless steel, nickel alloys and high strength copper alloys including but not limited to C.D.A. Copper Alloys 63800, 65400, 68800 and 51000.

The ferrule 28 should be long enough that when it is positioned to span the gap between the tubes 16, at least about $\frac{1}{8}$" of the ferrule overlaps each metal tube 16. While the ferrule 28 may have any desired wall thickness, it preferably has a thinner wall thickness than the walls of each tube 16. The larger diameter of the ferrule permits the use of the thinner walled ferrule. Where a certain degree of flexure is needed, the thinner walled ferrule may be formed from a material having higher stress characteristics than the material forming each tube. It is desirable that the ferrule 28 be as thin as possible to facilitate any subsequent fabrication operations such as fabricating an insulating layer not shown about the joined tubes 16. To further minimize the possibility of mechanical interference during subsequent fabrication operations and to minimize the possibility of electrical noise, the ends of the ferrule 28 are preferably smooth and tapered or blended to an $\alpha$ angle of less than about 10°, preferably about 2° to about 5°.

After the cable portions 10 and 12 and the fiber ends 26 have been prepared and the ferrule 28 positioned over one of the cable portions, the cable portions are each placed in a suitable holding device 30 such as a vise, a clamp or the like. Each cable portion should be placed in its respective holding device 30 without substantially any twist in the metal tube 16. Any suitable technique known in the art such as fusion welding using any conventional splicing means 58 may be used to splice the fiber ends 26 together. After the fiber splice joint has been completed, the cable portions 10 and 12 may be removed from the holding devices 30.

Upon completion of the fiber splice, the buffer coating 20 on the fiber optic element 18 should be reformed. This is preferably accomplished by first placing the cable portions 10 and 12 and the joined optical fibers in clamping device 32. The clamping device preferably comprises two platens 34 and 36. Each platen has a groove 38 adapted to fit in close relationship about the armor tubes 16. Each groove preferably has a diameter just slightly larger than the outer diameter of each tube 16. In a preferred clamping device construction, each groove 38 extends along the longitudinal axis of each platen and has a length sufficient to bridge the gap between the tubes 16 and overlap a portion of each tube.

When the platens 34 and 36 are placed in an abutting relationship, the grooves 38 define a cylindrical area 40 about the fiber splice joint. One of the platens 34 has an aperture 42 extending from an outer surface 44 to the groove 38. The aperture 42 permits an appropriate replacement buffer material 50 to be injected into the cylindrical area 40. Any suitable injecting device 46 such as a hypodermic needle may be used to inject the replacement buffer material 50 into the aperture 42. To permit air and gases to exhaust from the cylindrical area 40, at least one additional aperture, preferably two apertures 48, is also provided in the platen 34. Each aperture 48 also extends from the groove 38 to the outer surface 44.

Figure 6:
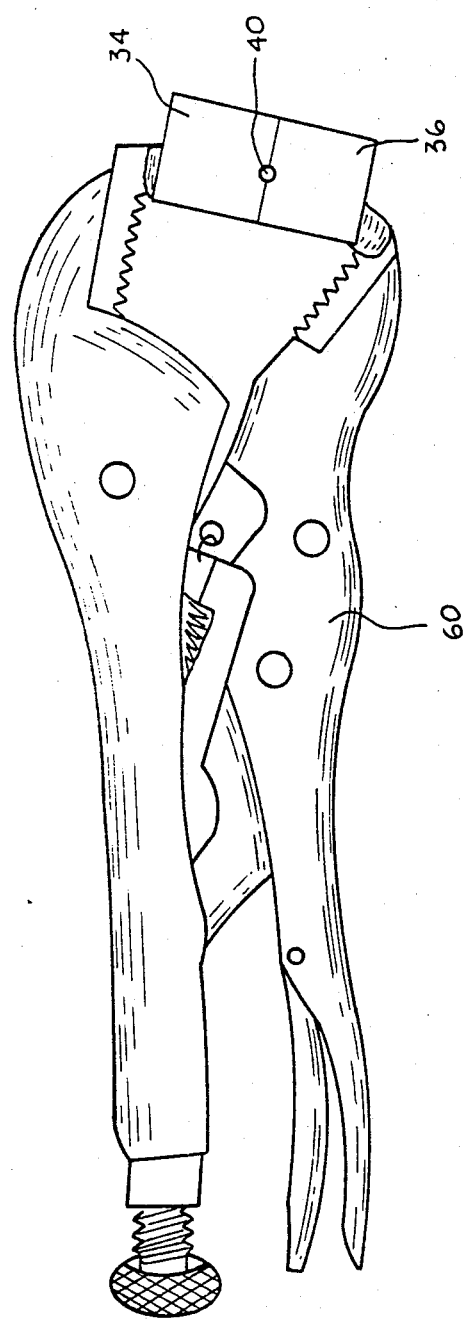
FIG. 6 is a top view of a hand tool incorporating the clamping device of FIG. 5.

The replacement buffer material may comprise any suitable buffer material known in the art such as a polymimide, a polyamide, a silicone, nylon or the like. If needed, one of the platens 36 may be provided with heating elements 52 to accelerate curing of the buffer material 50. The heating elements 52 may comprise any suitable heating device known in the art. For example, they may be resistance heating coils coupled to a suitable electrical power supply not shown. In a preferred construction, the clamping device 32 comprises a hand tool such as a modified vise grip plier 60 to which the platens are mounted as shown in FIG. 6.

When the clamping devices are removed, the replacement buffer material 50 should have an outer diameter substantially equal to the outer diameter of the tubes 16. If there are any dimples on or excess material about the periphery of the buffer material, they may be easily removed by any suitable means known in the art such as a razor blade or a knife.

After the replacement buffer material 50 has cured, the ferrule 28 is slid across the gap between the tubes 16 to bridge the buffer material 50 and overlap each tube 16. The ferrule 28 may be mechanically fastened to the tubes 16 using any suitable fastening means 56 and by any suitable sealing material known in the art such as solder, a brazing material or a conductive epoxy. In a preferred manner of performing the method of the present invention, the ferrule 28 is soldered or brazed to each tube 16. To form a relatively strong joint between the ferrule 28 and each tube 16, the inner surface 54 of the ferrule may be coated with a suitable solder or brazing material. For example, the surface 54 may be precoated with tin using a hot-tin dipping technique, a plating technique or the like.

In performing the method of the present invention, it is desirable that the ferrule 28 overlap each tube 16 so that a lap joint can be formed therebetween. The length of the overlap of the ferrule on both sides of the gap should be substantially equal to the shear strength of the brazing or solder material times its shear area which in turn is equal to the strength of the metal armor tubing times its cross-sectional area. A safety factor of about 2 to about 3 in the above expression can be easily achieved and is recommended. In most situations, an overlap of at least about $\frac{1}{8}$" will be sufficient.

After the repair patch or connection joint has been completed, one or more external layers not shown may be fabricated about the cable. For example, one or more layers of a suitable plastic or plastic materials may be extruded about the cable.

The solder or brazing material preferably used to bond the ferrule 28 to each tube 16 may comprise any suitable solder or brazing material known in the art. For example, a 60% tin-40% lead solder may be used.

The repair patch or connection joint fabricated by the method of the instant invention should be almost undistinguishable from the remainder of the cable. The repair patch or connection joint should have mechanical strength characteristics closely resembling or better than those of the original cable and should provide a hermetic seal for protecting the optical fiber or fibers from OH⁻ degradation.

While the method of the present invention may be used to repair or join any type of ultra-fine, small diameter optical fiber cable, it is particularly useful in repairing or joining optical fiber cables having a relatively thin solder or brazing coating such as a 60% tin-40% lead solder coating substantially surrounding the metal tubes 16.

While it is preferred to fasten the ferrule to each armor tube by soldering or brazing, the ferrule may also be fastened to each armor tube by welding or any other suitable fastening technique known in the art.

While it is preferred to form the ferrule from a single piece hollow cylindrical metal member, it may also be formed from a split metal member having a longitudinal seam to be sealed. The longitudinal seam may be sealed using any suitable sealing technique known in the art. Preferably, the seam would be sealed by soldering or brazing.

While it is preferred to use two grooved platens to form the clamping device 32, the clamping device 32 may be formed from any number of grooved platens.

While the tubes 16 and the ferrule 28 have been illustrated as having a substantially circular cross section, the method of the present invention may be used to join or repair cables having metal armor tubes with any desired cross section by appropriately shaping the ferrule 28 and its inner surface 54 and the grooves 38 in the platens to conform to the tube cross section.

The patents and patent application set forth in the specification are intended to be incorporated by reference herein.

It is apparent that there has been provided in accordance with this invention a technique for repairing and joining small diameter optical fiber cables which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method for repairing or joining together optical fiber cables, said method comprising:
   providing at least two spaced-apart optical fiber cables, each said cable comprising a length of metal tube housing an optical fiber having an end extending beyond said tube;
   sliding a hollow, substantially cylindrical metal ferrule having an inner diameter adapted to fit about the outer surface of each said tube over a first one of said tubes;
   splicing said optical fiber ends together;
   forming a substantially cylindrical area having an inner diameter substantially equal to the outer diameter of said tubes about said spliced ends;
   inserting a buffer material into said substantially cylindrical area; and
   moving said ferrule over said buffer material and into overlapping relationship with each said metal tube,
   whereby said ferrule spans the gap between said spaced-apart tubes and said buffer material surrounds said spliced optical fiber ends.

2. The method of claim 1 further comprising:
   fastening said ferrule to each said metal tube.

3. The method of claim 2 wherein said fastening step comprises:
   soldering or brazing said ferrule to each said tube.

4. The method of claim 3 further comprising:
   coating an inner surface of said ferrule with a solder or brazing material prior to said soldering or brazing step.

5. The method of claim 1 wherein said substantially cylindrical area forming step comprises:
   providing at least two platens, each said platen having a groove adapted to fit about each said tube and a length sufficient to span the gap between said spaced-apart cables and to overlap a portion of each said tube; and
   placing said platens in abutting contact,
   whereby said grooves define said substantially cylindrical area.

6. The method of claim 5 wherein said buffer material inserting step comprises:
   providing at least one of said platens with an aperture extending from an outer surface of said at least one platen to said substantially cylindrical area; and
   injecting said buffer material into said substantially cylindrical area through said aperture.

7. The method of claim 6 further comprising:
   providing said at least one platen with at least one additional aperture extending between said outer surface and said substantially cylindrical area; and
   heating said buffer material to accelerate its curing,
   whereby any air, gases, and excess buffer material in said substantially cylindrical area exhaust from said cylindrical area through said at least one additional aperture.

8. The method of claim 1 wherein said cables providing step comprises:
   providing a single length of optical fiber cable having a single length of metal tube containing one optical fiber;
   removing a section of said metal tube to form said at least two spaced-apart cables and to expose said optical fiber; and
   trimming away a portion of said optical fiber to form said ends extending beyond said tubes.

9. The method of claim 1 wherein said splicing step comprises:
   fusion welding said fiber ends together.

10. An apparatus for joining together at least two spaced-apart optical fiber cables, each said cable comprising a length of metal tube housing an optical fiber having an end extending beyond said tube, said apparatus comprising:
    means for splicing said optical fiber ends together;
    means for forming a substantially cylindrical area having an inner diameter substantially equal to the outer diameter of said tubes about said spliced ends, said forming means having means for inserting a buffer material into said substantially cylindrical area so that said buffer material substantially surrounds said spliced optical fiber ends and substantially fills said substantially cylindrical area; and
    a hollow, substantially cylindrical, slidable metal ferrule adapted to fit about the outer diameter of each tube, said ferrule being placed over a first one of said tubes prior to the fiber ends being spliced and positioned over said buffer material and into overlapping relationship with each said metal tube after insertion of said buffer material.

11. The apparatus of claim 10 further comprising:
    means for fastening said ferrule to each said metal tube.

12. The apparatus of claim 11 wherein said fastening means comprises:

means for brazing or soldering said ferrule to each said metal tube.

13. The apparatus of claim 12 further comprising:
said ferrule having an inner surface coated with a solder or brazing material to facilitate said soldering or brazing.

14. The apparatus of claim 10 further comprising:
said ferrule having a wall thickness less than the wall thickness of each said tube and tapered edges for minimizing electrical noise and facilitating subsequent fabrication operations by minimizing mechanical interference.

15. The apparatus of claim 11 further comprising:
said ferrule being formed from a material selected from the group consisting of copper alloys, nickel alloys, steel and stainless steel.

16. The apparatus of claim 10 wherein said forming means comprises:
at least two platens, each said platen having a groove adapted to fit about each said tube and a length sufficient to span the gap between said spaced-apart cables and overlap a portion of each said tube,
whereby upon placing said platens together, said grooves define said substantially cylindrical area.

17. The apparatus of claim 16 further comprising:
said inserting means comprising an aperture extending from an outer surface of at least one platen to said substantially cylindrical area; and
means for injecting said buffer material into said substantially cylindrical area through said aperture.

18. The apparatus of claim 17 further comprising:
said at least one platen being provided with at least one additional aperture extending between said outer surface and said substantially cylindrical areas; and
means for heating said buffer material to accelerate its curing,
whereby any air, gases and excess buffer material in said substantially cylindrical area exhaust from said cylindrical area through said at least one additional aperture.

19. The apparatus of claim 18 wherein said heating means comprises:
at least one heating element housed within another of said platens.

20. The apparatus of claim 10 further comprising:
said spaced-apart cables being formed from a single length of cable having a single metal tube containing one fiber; and
said buffer material and said ferrule forming a repair patch for said single length of cable.

* * * * *

UNITED STATES PATENT OFFICE
CERTIFICATE OF CORRECTION

Patent No. 4,585,304             Dated April 29, 1986

Inventor(s) JOSEPH WINTER ET AL.

It is certified that error appears in the above-identified patent and that said Letters Patent are hereby corrected as shown below:

On the cover page of the patent, left-hand column, line 8, the Assignee should be changed to be --Olin Corporation-- and "Virginia" should be deleted.

Signed and Sealed this

Twentieth Day of January, 1987

Attest:

DONALD J. QUIGG

Attesting Officer        Commissioner of Patents and Trademarks